United States Patent Office 3,429,892
Patented Feb. 25, 1969

3,429,892
SPIRO[NAPHTHALENE-2,2'-OXAZOLIDINE]
COMPOUNDS
Bernard Loev, Broomall, Pa., assignor to Smith Kline &
French Laboratories, Philadelphia, Pa., a corporation
of Pennsylvania
No Drawing. Filed Mar. 14, 1967, Ser. No. 622,916
U.S. Cl. 260—307                    4 Claims
Int. Cl. C07d 85/26, 5/16, 31/40

ABSTRACT OF THE DISCLOSURE

Spiro compounds, prepared by reacting an α-aminoalkyl substituted methanol with 3,4-dihydro-2(1H)naphthalenone, have antidepressant activity.

This invention relates to new spiro[naphthalene-2,2'-oxazolidine] compounds having pharmacodynamic activity, in particular having antidepressant activity.

The compounds of this invention are represented by the following formula:

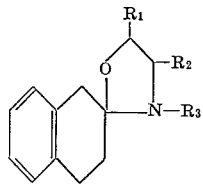

in which:

$R_1$ is phenyl, phenyl substituted by from one to two halo, hydroxy, lower alkyl or lower alkoxy substituents, trifluoromethylphenyl, cyanophenyl, methylenedioxyphenyl, pyridyl, furyl or thienyl;
$R_2$ is lower alkyl and
$R_3$ is hydrogen or lower alkyl.

Advantageous compounds of this invention are represented by the above formula in which $R_1$ is phenyl, halophenyl, dihalophenyl, hydroxyphenyl, dihydroxyphenyl tolyl, xylyl, methoxyphenyl, dimethoxyphenyl and methylenedioxyphenyl, $R_2$ is methyl or ethyl and $R_3$ is hydrogen, methyl or ethyl.

A preferred compound of this invention is 1,2,3,4-tetrahydro-3',4'-dimethyl-5' - phenylspiro[naphthalene - 2,2'-oxazolidine] which is represented by the above formula when $R_1$ is phenyl and $R_2$ and $R_3$ are methyl.

The compounds of this invention are prepared by the following procedure:

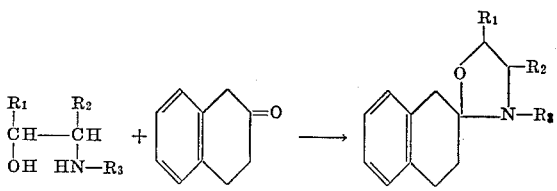

The terms $R_1$, $R_2$ and $R_3$ are as defined above.

According to the above procedure an α-aminoalkyl substituted methanol is reacted with 3,4-dihydro-2(1H)-naphthalenone. The reaction is preferably carried out in an inert solvent such as a hydrocarbon, for example benzene or toluene, at elevated temperature, conveniently at reflux temperature. Advantageously, water is removed during the reaction by using an azeotroping device or a drying agent such as magnesium sulfate or molecular sieve. Optionally, an acid catalyst, such as methane sulfonic acid, toluene sulfonic acid or a strong acid ion exchange resin, may be employed, in particular when an azeotroping device is used.

The α-aminoalkyl substituted methanol starting materials are either known to the art or are prepared by the following procedure:

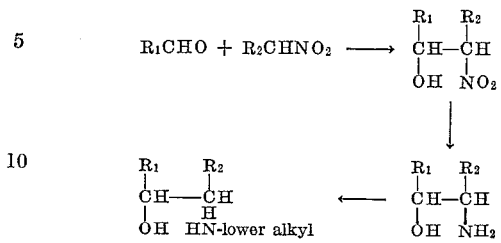

The terms $R_1$ and $R_2$ are as defined above.

According to the above procedure, a carboxaldehyde is condensed with a nitroalkene in the presence of a basic condensing agent such as a sodium methoxide in a solvent such as a methanol. Treating with acid such as dilute acetic acid gives the α-nitroalkyl substituted methanol. This nitro alcohol is reduced, for example with lithium aluminum hydride in tertahydrofuran, to give the α-primary aminoalkyl substituted methanol starting materials. Alkylation of the primary amino compounds by, for example, reacting with a lower alkyl halide or with an acylating agent such as ethyl formate or acetyl chloride and reducing the resulting N-acylamino alcohol with a reducing agent such as lithium aluminum hydride gives the α-mono-lower alkylaminoalkyl substituted methanol starting materials.

The compounds of this invention may exist in sterosiomeric forms, that is, as d and l optical isomers as well as dl mixtures and as cis and trans isomers as well as cis-trans mixtures. It is intended that the general formulas presented herein include all of these stereoisomers, the separated isomers as well as mixtures thereof. The isomers are conveniently prepared from the corresponding isomers of the α-aminoalkyl substituted methanol starting materials.

The terms "lower alkyl" and "lower alkoxy" where used herein denote groups having 1–4, preferably 1–2, carbon atoms.

The compounds of this invention may be combined with pharmaceutical carriers according to accepted pharmaceutical practices and administered internally in conventional dosage forms containing an appropriate dose of the compound.

The following examples are not limiting but are illustrative of this invention.

Example 1

To 5.7 g. of d-pseduoephedrine in 150 ml. of benzene is added 5 g. of 3,4-dihydro-2(1H)-naphthaylenone. The solution is refluxed overnight with an azeotroping device to remove water. One drop of methane sulfonic acid is added and the refluxing is continued overnight while removing water. The solution is concentrated to dryness. The residue is washed with petroleum ether and extracted with isopropyl ether. The isopropyl ether solution is treated with charcoal, filtered, concentrated and chilled to give, on filtering, d-1,2,3,4-tetrahydro-3',4'-dimethyl-5'-phenylspiro[naphthalene-2,2'-oxazolidine].

Similarly, using l-ephedrine and dl-ephedrine the products are l-1,2,3,4-tetrahydro-3',4'-dimethyl-5'-phenylspiro[naphthalene-2,2'-oxazolidine] and dl-1,2,3,4-tetrahydro-3,4'-dimethyl-5'-phenylspiro[naphthalene - 2,2' - oxazolidine], respectively.

Example 2

By the procedure of Example 1, equivalent amounts of 3,4-dihydro-2(1H)-naphthalenone and each of the following ephedrine derivatives are reacted:

o-chloroephedrine
p-fluoroephedrine
m-hydroxyephedrine p-methylephedrine
p-methoxyephedrine
2,5-diethoxyephedrine
3,4-dimethylephedrine
2,5-dichloroephedrine to give the following products, respectively:

5'-(o-chlorophenyl)-1,2,3,4-tetrahydro - 3',4'-dimethylspiro[naphthalene-2,2'-oxazolidine]

5'-(p-fluorophenyl)-1,2,3,4 - tetrahydro-3',4,'-dimethylspiro[naphthalene-2,2'-oxazolidine]

1,2,3,4 - tetrahydro - 5'-(m-hydroxyphenyl)-3',4'-dimethylspiro[naphthalene-2,2'-oxazolidine]

1,2,3,4 - tetrahydro - 3',4' - dimethyl - 5' - (p-tolyl)-spiro[naphthalene-2,2'-oxazolidine]

1,2,3,4 - tetrahydro - 5'-(p-methoxyphenyl)-3'4' - dimethylspiro[naphthalene-2,2'-oxazolidine]

5'-(2,5-diethoxyphenyl)-1,2,3,4 - tetrahydro-3',4' - dimethylspiro[naphthalene-2,2'-oxazolidine]

1,2,3,4 - tetrahydro - 3',4' - dimethyl - 5'-(3,4-xylyl)-spiro[naphthalene-2,2'-oxazolidine]

5'-(2,5-dichlorophenyl) - 1,2,3,4-tetrahydro - 3',4'- dimethylspiro[naphthalene-2,2'-oxazolidine]

Example 3

To 17.4 g. of p-trifluoromethylbenzaldehyde and 15 g. of nitroethane in 60 ml. of ethanol at 0° C. is added a solution of 5.4 g. of sodium methoxide in 60 ml. of methanol. The resulting mixture is stirred at room temperature for six hours, then cooled and the solid material is filtered off and dissolved in water. Dilute acetic is added. Extracting with ether and removing the ether from the extract gives 2-nitro-1-(p-trifluoromethylphenyl)propanol.

A mixture of 249.9 g. of the above prepared nitropropanol compound, 4.0 g. of lithium aluminum hydride and 350 ml. of tetrahydrofuran is stirred for two hours, then hydrolyzed by pouring into water. The mixture is made strongly alkaline with aqueous sodium hydroxide and the oil is extracted with chloroform. The extract is evaporated, in vacuo, to give α-(1-aminoethyl)-p-trifluoromethylbenzyl alcohol.

A mixture of 4.3 g. of 2-amino-1-(p-trifluoromethylphenyl)propanol, 2.1 g. of methyl iodide and 100 ml. of methanol is heated at reflux for 12 hours. The resulting mixture is evaporated to dryness, in vacuo. The residue is recrystallized from isopropanol, then dissolved in warm water. The solution is made alkaline with aqueous sodium hydroxide. The oil that separates is extracted with methylene chloride and then the organic solution is concentrated to give p-trifluoromethylephedrine.

3,4-dihydro-2(1H)-naphthalenone (14.6 g.) is added to 23.3 g. of p-trifluoromethylephedrine in 200 ml. of benzene. The resulting mixture is heated at reflux for 10 hours while removing water with an azeotroping device, then four drops of methane sulfonic acid is added and the refluxing, with removal of water, is continued for eight hours. The mixture is concentrated to dryness and the residue is washed with petroleum ether. Extracting with isopropyl ether, then concentrating, cooling and filtering the extracts gives 1,2,3,4-tetrahydro-3'4'-dimethyl-5'-(p - trifluoromethylphenyl) - spiro[naphthalene - 2,2'-oxazolidine].

In the same manner, using p-cyanobenzaldehyde and 2-thiophenecarboxaldehyde in place of p-trifluoromethylbenzaldehyde the products are 5'-(p-cyanophenyl)-1,2,3,4-tetrahydro-3',4'-dimethylspiro[naphthalene - 2,2'-oxazolidine] and 1,2,3,4-tetrahydro-3',4'-dimethyl-5'-(2-thienyl)-spiro[naphthalene-2,2'-oxazolidine], respectively.

Example 4

3,4-dihydro-2(1H)-naphthalenone (14.6 g.) is added to 15.5 g. of norephedrine in 200 ml. of benzene. The resulting solution is heated at reflux for 16 hours with three drops of methane sulfonic acid while removing water. The solution is concentrated to dryness. The residue is washed with petroleum ether, then extracted with isopropyl ether. The extract is treated with charcoal and filtered. The filtrate is concentrated, cooled and filtered to give 1,2,3,4-tetrahydro-4'-methyl-5'-phenylspiro[naphthalene-2,2'-oxazolidine].

Similarly, using in place of norphedrine in the above procedure the following:

α-(1-aminoethyl)-p-bromobenzyl alcohol
α-(1-aminoethyl)-p-butylbenzyl alcohol
α-(1-aminoethyl)-m-hydroxybenzyl alcohol
α-(1-aminoethyl)-3,4-methylenedioxybenzyl alcohol
α-(1-aminoethyl)-3,4-dihydroxybenzyl alcohol
α-(1-aminoethyl)-2,5-dimethoxybenzyl alcohol
α-(1-aminoethyl)-2-methoxy-5-methylbenzyl alcohol the products are, respectively:

5' - (p - bromophenyl)-1,2,3,4-tetrahydro - 4'-methylspiro[naphthalene-2,2'-oxazolidine]

5' - (p - butylphenyl)-1,2,3,4-tetrahydro - 4'-methylspiro[naphthalene-2,2'-oxazolidine]

1,2,3,4 - tetrahydro - 5'-(m-hydroxyphenyl)-4'-methylspiro[naphthalene-2,2'-oxazolidine]

1,2,3,4-tetrahydro-4' - methyl-5'-(3,4-methylene-dioxyphenyl)spiro[naphthalene-2,2'-oxazolidine]

5' - (3,4 - dihydroxyphenyl)-1,2,3,4-tetrahydro - 4'-methylspiro[naphthalene-2,2'-oxazolidine]

1,2,3,4 - tetrahydro - 5' - (2,5 - dimethoxyphenyl) - 4'-methylspiro[naphthalene-2,2'-oxazolidine]

1,2,3,4 - tetrahydro-5'-(2-methoxy - 5-methylphenyl)-4'-methylspiro[naphthalene 2,2'-oxazolidine].

Example 5

By the procedure of Example 4, 14.6 g. of 3,4-dihydro-2(1H)-naphthalenone is reacted with 17.9 g. of α-(1-ethylaminoethyl)benzyl alcohol to give 3'-ethyl-1,2,3,4-tetrahydro-4' - methyl-5' - phenylspiro[naphthalene-2,2'-oxazolidine].

Using 14.6 g. of 3,4-dihydro-2(1H)-naphthalenone and 20.7 g. of α-[1-(n-butyl)-aminoethyl]benzyl alcohol in the procedure of Example 4 gives 3'-(n-butyl)-1,2,3,4-tetrahydro - 4'-methyl - 5'-phenylspiro[naphthalene-2,2'-oxazolidine].

Example 6

To 26.7 g. of α-(1-aminobutyl)-3,4-diethoxybenzyl alcohol in 450 ml. of benzene is added 14.6 g. of 3,4-dihydro-2(1H)-naphthalenone. The resulting mixture is refluxed with 0.5 ml. of methane sulfonic acid for ten hours while removing water to give, after working up as in Example 4, 5'-(3,4-diethoxyphenyl)-1,2,3,4-tetrahydro-4'-propylspiro[naphthalenone-2,2'-oxazolidine] .

Example 7

3,4-dihydro-2(1H)-naphthalenone (7.3 g.) is added to 7.8 g. of α-(1methylaminoethyl)furfuryl alcohol in 150 ml. of toluene. Heating this mixture at reflux with 0.5 ml. of methane sulfonic acid while removing water and working up as in Example 4 gives 5'-(2-furyl)-1,2,3,4-tetrahydro-3',4'-dimethyl-spiro[naphthalene-2,2'-oxazolidine].

Using 7.6 g. of α-(1-aminoethyl)-4-pyridine-methanol in place of α-(1-methylaminoethyl)furfuryl alcohol in the above procedure the product is 1,2,3,4-tetrahydro-4'-methyl-5'-(4-pyridyl)spiro[naphthalene-2,2'-oxazolidine].

What is claimed is:
1. A compound of the formula:

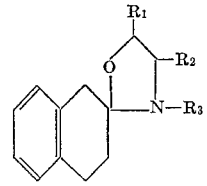

in which:

R₁ is phenyl, phenyl substituted by from one to two halo, hydroxy, lower alkyl or lower alkoxy substituents, trifluoromethylphenyl, cyanophenyl, methylenedioxyphenyl, pyridyl, furyl or thienyl;
$R_2$ is lower alkyl and
$R_3$ is hydrogen or lower alkyl.

2. A compound according to claim 1 in which $R_1$ is phenyl and $R_2$ and $R_3$ are methyl.

3. A compound according to claim 1 in which $R_1$ is m-hydroxyphenyl, $R_2$ is methyl and $R_3$ is hydrogen.

4. A compound according to claim 1 in which $R_1$ is 2,5-dimethoxyphenyl, $R_2$ is methyl and $R_3$ is hydrogen.

References Cited

UNITED STATES PATENTS 3,264,319   8/1966   Kamal _____ 260—307

ALTON D. ROLLINS, *Primary Examiner.*

U.S. Cl. X.R.

167—65; 260—296, 332.3, 340.5, 347.7, 465, 570.6, 618